E. J. VRAALSTAD.
ROAD ENGINE.
APPLICATION FILED APR. 8, 1910.
1,048,608.
Patented Dec. 31, 1912.
3 SHEETS—SHEET 2.
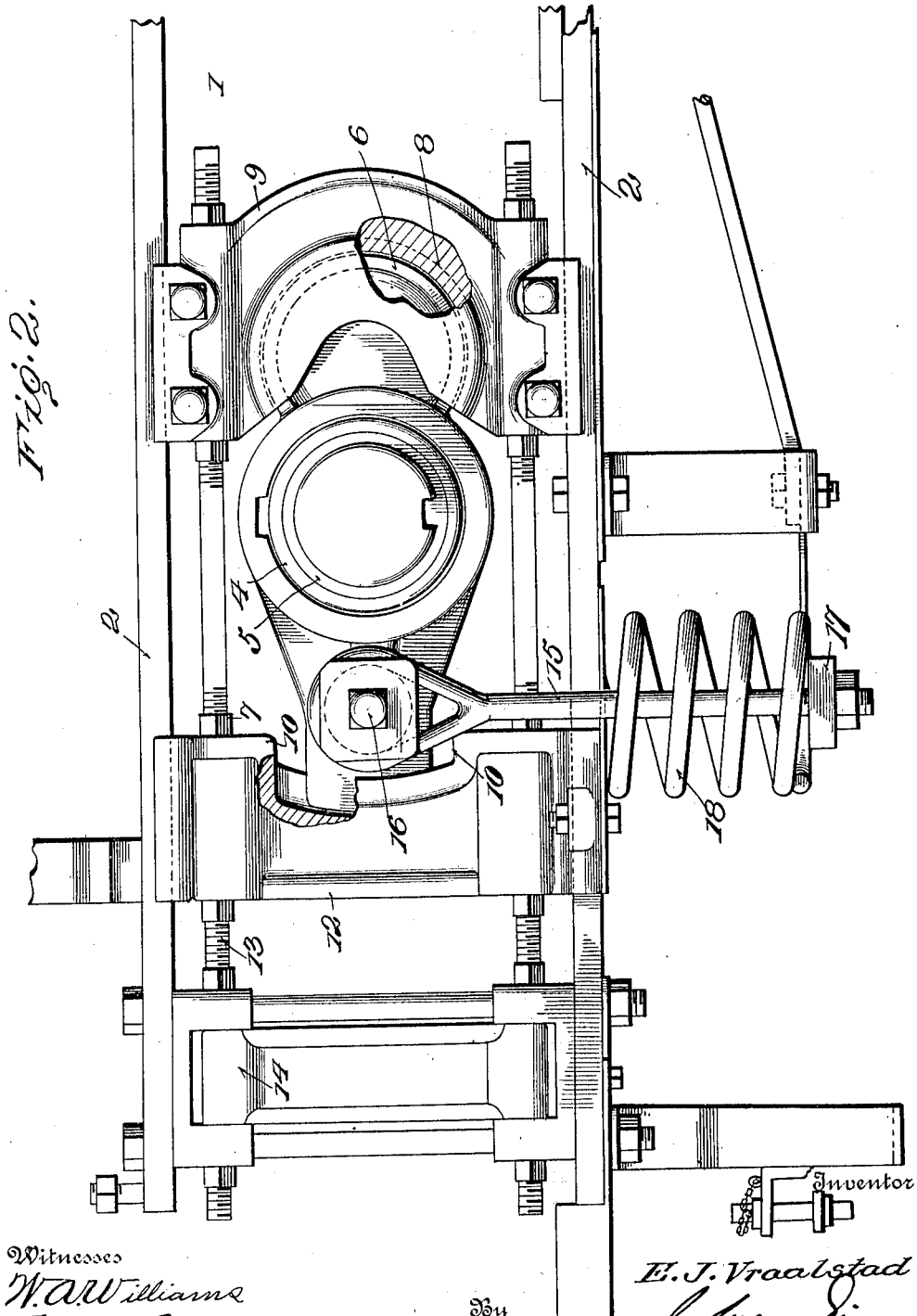

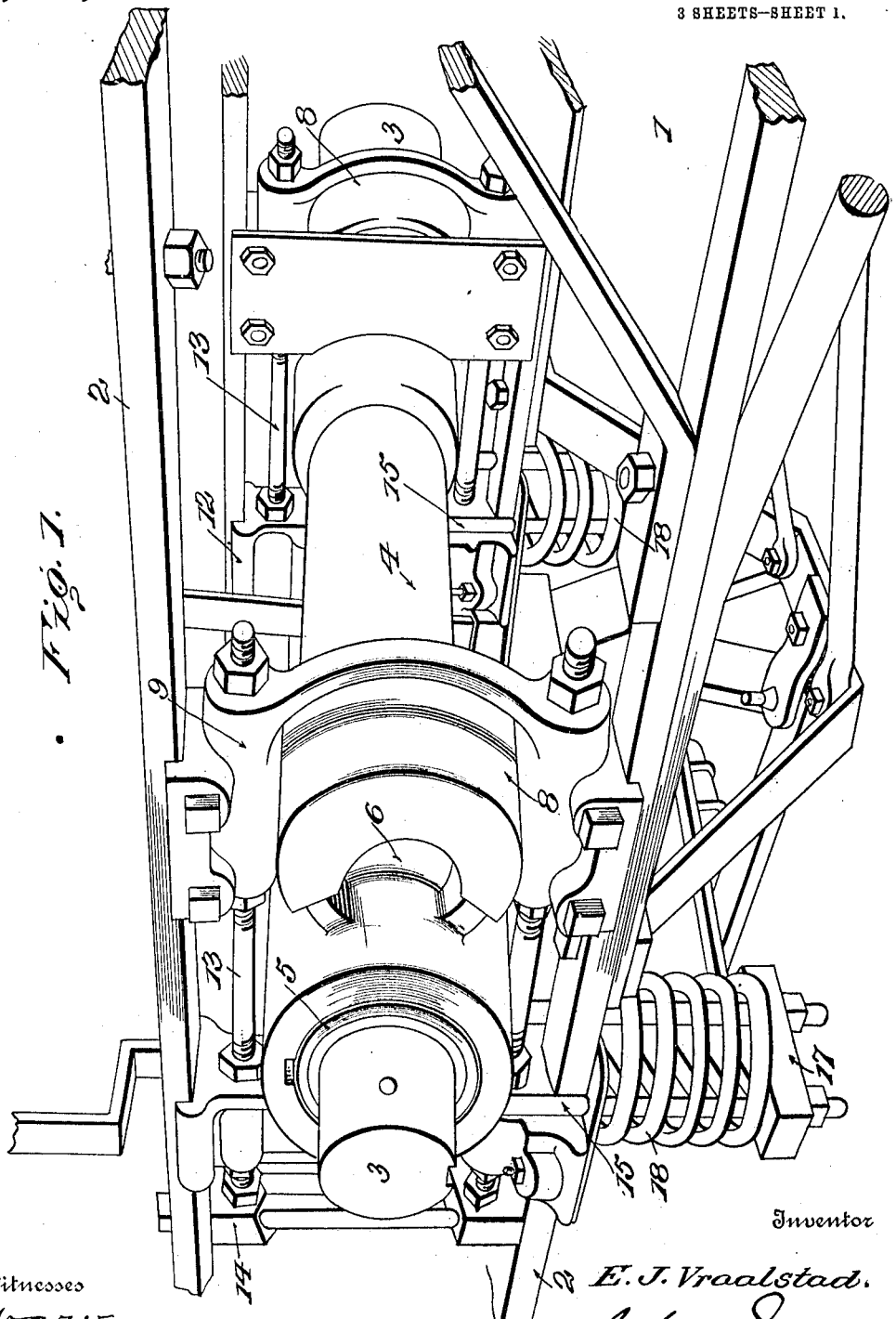

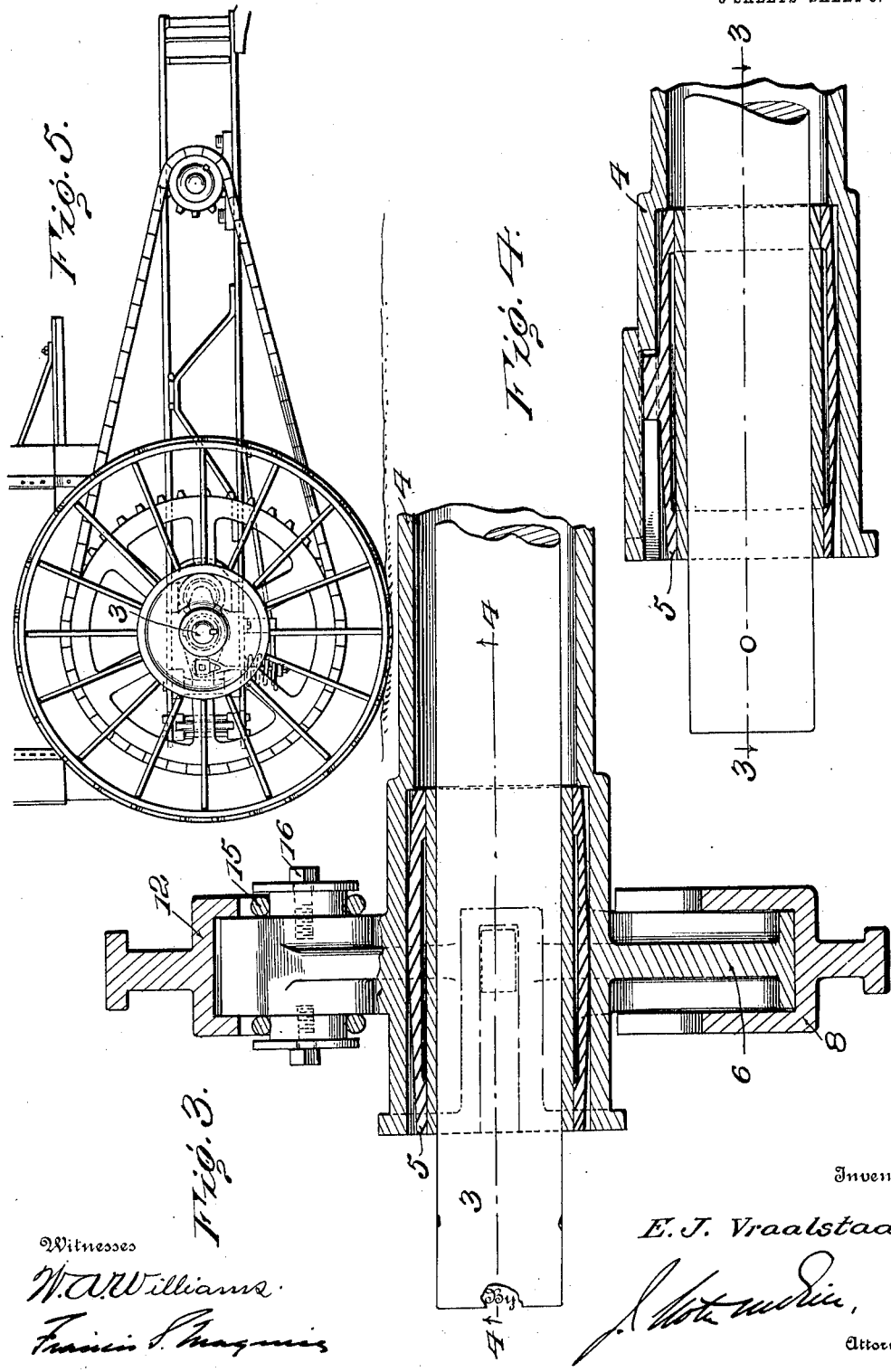

UNITED STATES PATENT OFFICE.

EDWARD J. VRAALSTAD, OF BUFFALO, NEW YORK.

ROAD-ENGINE.

1,048,608.  Specification of Letters Patent.  Patented Dec. 31, 1912.

Application filed April 8, 1910. Serial No. 554,154.

*To all whom it may concern:*

Be it known that I, EDWARD J. VRAALSTAD, of Buffalo, in the county of Erie and State of New York, have invented certain new and useful Improvements in Road-Engines; and I do hereby declare the following to be a full, clear, and exact description of the invention, such as will enable others skilled in the art to which it appertains to make and use the same.

The object of this invention is to maintain, under all conditions, the parallelism between the frame or body and the axle of the driven wheels of a road engine or motor vehicle having spring mountings or connections between the axle and the body, whereby the driving mechanism may be kept in perfect alinement in passing over rough or uneven roads.

A further object is to equally distribute the strain to the springs on both sides of the machine when either side is higher or lower than the other, as when one wheel strikes an obstruction or enters a depression.

The invention will be hereinafter fully set forth and particularly pointed out in the claims.

In the accompanying drawings, Figure 1 is a view in perspective of a portion of the engine frame, the wheels being omitted. Fig. 2 is a side elevation, with parts broken away. Fig. 3 is a horizontal sectional view through one end of the axle sleeve and its connections. Fig. 4 is a section on line 4—4, Fig. 3. Fig. 5 is a side elevation on a reduced scale.

My invention will be described in connection with a traction engine for which it was specifically designed, but it is applicable to any road engine or motor vehicle having resilient connections between the axle of the driven wheels and the body.

Referring to the drawings, 1 designates a portion of the frame or body of a traction engine; 2 the upper and lower horizontal side bars thereof, and 3 the axle upon which the carrying wheels are mounted.

4 is a sleeve or casing for the axle extending transversely of the body and inclosing nearly the full length of the axle. The diameter of this sleeve is enlarged at each end to accommodate bushings 5 which may be held as against turning by lugs and grooves. Each end of the sleeve is formed as a lever of the second order; that is, each end has a rearwardly extending arm 6 and a forwardly extending arm 7. The arms 6 are approximately disk-like and fit in curved bearings 8 formed in vertically-disposed members 9 of the frame, while the forwardly-projecting arms 7 are located between upper and lower shoulders forming stops 10 on the rear of frame members 12. These two frame members, 9 and 12, are fitted between the upper and lower side bars 2 and may be adjusted longitudinally thereof by threaded rods 13 engaging fixed frame members 14.

From the free ends of the forwardly projecting arms 7 depend hangers 15, each being shown as composed of two corresponding rods having eyes for the passage of a connecting bolt 16, said rods at their lower ends being connected by cross plates 17 which are held by nuts on the rods. Between these plates and the lower side bars 2 are spiral springs 18 which serve to normally hold the free ends of the lever arms 7 about midway between the stops 10.

When either carrying wheel of the driven axle passes over an obstruction, or enters a rut or hole, causing in one instance the raising and in the other the lowering of the axle at one end, the other end travels uniformly with it, both ends rising or falling simultaneously. Thus the parallelism between the axle and the body of the machine is always maintained; the strain on the springs is uniform, and the driving mechanism, be it chain or gearing, between the driving shaft and the axle of the driven wheels maintains perfect alinement under all conditions. In the raising of the axle there is also a relative downward movement between it and the frame or body since the lever arms 6 have knuckle-like fulcrums on the frame.

Changes may be made in the construction and arrangement of parts without departing from the spirit of my invention.

Although I have shown springs at each end of the axle sleeve, it is obvious that a single spring may be employed if located at a point intermediate the ends of the sleeve, but I prefer to use two springs. It is also within the scope of my invention to dispense with the sleeve and form the lever arms with or secure them directly to the axle.

I claim as my invention:—

1. The combination with a frame, of an axle extending transversely of the frame, carrying wheels on the axle, end connections between the axle and the frame comprising forwardly and rearwardly projecting arms, one of the arms at each end of the axle being rounded, bearings carried by the frame wherein the rounded arms are free to turn, and yielding means acting on the remaining arms.

2. The combination with a frame, of an axle extending transversely of the frame, carrying wheels on the axle, a sleeve for said axle extended transversely of the frame, forwardly and rearwardly projecting arms carried by said sleeve at its opposite ends, bearings carried by the frame wherein one arm at each end of the sleeve is free to turn, and yielding means acting on the remaining arms.

3. The combination with a frame, of an axle extending transversely of the frame, carrying wheels on the axle, a sleeve for said axle extended transversely of the frame, forwardly and rearwardly projecting arms carried by said sleeve at its opposite ends, one arm at each end being rounded, knuckle-like bearings carried by the frame wherein said rounded arms are free to turn, and springs interposed between the frames and the remaining arms of the sleeve.

4. The combination with a frame, of an axle, a sleeve therefor extended transversely of the frame, forwardly and rearwardly projecting arms at opposite ends of the sleeve, a member at each side of the frame forming each a bearing for one arm, a second member at each side of the frame having stops for limiting the movements of the other arms, and springs acting on the latter arms.

5. The combination with a frame, of an axle, a sleeve therefor extended transversely of the frame, forwardly and rearwardly projecting arms at opposite ends of the sleeve, a member at each side of the frame forming each a bearing for one arm, a second member at each side of the frame having stops for limiting the movements of the other arms, springs acting on the latter arms, and means for adjusting said members longitudinally of the frame.

6. The combination with a frame, of an axle, a sleeve therefor extended transversely of the frame, forwardly and rearwardly projecting arms at opposite ends of the sleeve, one arm at each end of the sleeve being rounded, a member at each side of the frame forming a knuckle-like bearing for the adjacent rounded arm, a second member at each side of the frame having stops for limiting the movements of the other arms, springs acting on the latter arms, and means for adjusting said members longitudinally of the frame.

In testimony whereof, I have signed this specification in the presence of two subscribing witnesses.

EDWARD J. VRAALSTAD.

Witnesses:
H. P. Seipp,
S. Y. Van Arnam.

---

Copies of this patent may be obtained for five cents each, by addressing the "Commissioner of Patents, Washington, D. C."